US 9,379,979 B2

(12) United States Patent
Solis

(10) Patent No.: US 9,379,979 B2
(45) Date of Patent: Jun. 28, 2016

(54) METHOD AND APPARATUS FOR ESTABLISHING A VIRTUAL INTERFACE FOR A SET OF MUTUAL-LISTENER DEVICES

(71) Applicant: Palo Alto Research Center Incorporated, Palo Alto, CA (US)

(72) Inventor: Ignacio Solis, South San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 194 days.

(21) Appl. No.: 14/155,125

(22) Filed: Jan. 14, 2014

(65) Prior Publication Data

US 2015/0200852 A1 Jul. 16, 2015

(51) Int. Cl.
*H04L 12/28* (2006.01)
*H04L 12/743* (2013.01)
*H04L 5/14* (2006.01)
*H04L 12/18* (2006.01)
*H04W 84/18* (2009.01)

(52) U.S. Cl.
CPC .............. *H04L 45/7453* (2013.01); *H04L 5/14* (2013.01); *H04L 12/189* (2013.01); *H04L 12/1886* (2013.01); *H04W 84/18* (2013.01)

(58) Field of Classification Search
CPC ..... H04L 45/7453; H04L 5/14; H04L 12/189; H04L 12/1889; H04W 84/18
USPC .............................. 370/351, 395.53, 400, 408
See application file for complete search history.

(56) References Cited

U.S. PATENT DOCUMENTS

| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,506,844 | A | 4/1996 | Rao |
| 5,629,370 | A | 5/1997 | Freidzon |
| 5,870,605 | A | 2/1999 | Bracho |
| 6,052,683 | A | 4/2000 | Irwin |
| 6,091,724 | A | 7/2000 | Chandra |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Phuc Tran
(74) *Attorney, Agent, or Firm* — Shun Yao; Park, Vaughan, Fleming & Dowler LLP

(57) ABSTRACT

An ad-hoc network device facilitates creating a virtual interface for a set of mutual-listener devices that have a duplex communication with each other. During operation, the network device can receive a packet, and identifies a virtual interface to which the packet is directed. The network device can determine whether the local network device is a member of the virtual interface, and if so, processes the packet as an intended recipient of the packet.

19 Claims, 11 Drawing Sheets

(56) References Cited

U.S. PATENT DOCUMENTS

| | | | |
|---|---|---|---|
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 * | 3/2005 | Bertagna ............ H04L 12/4641 370/392 |
| 6,901,452 B1 * | 5/2005 | Bertagna ............ H04L 12/4641 370/351 |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 * | 4/2007 | Murakami .......... H04L 67/1097 709/213 |
| 7,257,837 B2 | 8/2007 | Xu |
| 7,287,275 B2 | 10/2007 | Moskowitz |
| 7,315,541 B1 | 1/2008 | Housel |
| 7,339,929 B2 * | 3/2008 | Zelig ................. H04L 12/1836 370/390 |
| 7,350,229 B1 | 3/2008 | Lander |
| 7,382,787 B1 | 6/2008 | Barnes |
| 7,444,251 B2 | 10/2008 | Nikovski |
| 7,466,703 B1 * | 12/2008 | Arunachalam ......... H04L 45/00 370/351 |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 * | 2/2010 | Oguchi ............... H04L 12/4641 370/229 |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 * | 5/2011 | Devireddy ............ H04L 49/70 370/395.21 |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |

(56) References Cited

U.S. PATENT DOCUMENTS

| | | |
|---|---|---|
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1* | 4/2008 | Yarvis ............... H04B 7/026 370/338 |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1* | 1/2011 | Xue ............... H04L 12/4679 370/395.5 |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1* | 6/2012 | Lo ............... H04L 12/18 370/354 |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |

(56) References Cited

U.S. PATENT DOCUMENTS

| | | |
|---|---|---|
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1* | 5/2014 | Stark .................. G06F 9/526 711/219 |
| 2014/0140348 A1* | 5/2014 | Perlman .................. H04L 45/26 370/400 |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | Dekozan |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1* | 7/2014 | Dumitriu ............ H04L 12/4625 709/223 |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1* | 7/2015 | Naiksatam .......... H04L 41/0893 370/254 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library-Pairing-Based Cryptography-About," http://crypto.stanford.edu/pbc.downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Ateniese et al., "Improved Proxy Re-Encryption Schemes with Applications to Secure Distributed Storage", 2006.

Xiong et al., "CloudSeal: End-to-End Content Protection in Cloud-based Storage and Delivery Services", 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit.

J. Shao and Z. Cao. CCA-Secure Proxy Re-Encryption without Pairings. Public Key Cryptography. Springer Lecture Notes in Computer Sciencevol. 5443 (2009).

Gopal et al. "Integrating content-based Mechanisms with hierarchical File systems", Feb. 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/ www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/ Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012.

Jacobson, Van et al. 'VoCCN: Voice Over Content-Centric Networks.' Dec. 1, 2009. ACM ReArch'09.

(56) References Cited

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peerto-Peer to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.

(56) References Cited

OTHER PUBLICATIONS

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E. Uzun, S. Sevilla, and J. Garcia-Luna-Aceves, "CCN-krs: A key resolution service for CCN," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans. on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, Ca, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce, [Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

(56) References Cited

OTHER PUBLICATIONS

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherell, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

* cited by examiner

ADJACENCY TABLE 400

| NODE A | NODE B |
|--------|--------|
|        | NODE C |

ADJACENCY TABLE 410

| NODE B | NODE A |
|--------|--------|
|        | NODE C |
|        | NODE D |
|        | NODE E |

ADJACENCY TABLE 420

| NODE C | NODE A |
|--------|--------|
|        | NODE B |
|        | NODE D |
|        | NODE E |

ADJACENCY TABLE 430

| NODE D | NODE B |
|--------|--------|
|        | NODE C |
|        | NODE E |

ADJACENCY TABLE 440

| NODE E | NODE B |
|--------|--------|
|        | NODE C |
|        | NODE D |

FIG. 4

NODE A VIRTUAL INTERFACES
← 500

| FACE 1 | FACE 2 | FACE 3 |
|--------|--------|--------|
| NODE A | NODE A | NODE A |
| NODE B | NODE C | NODE B |
|        |        | NODE C |

NODE B VIRTUAL INTERFACES
← 510

| FACE 1 | FACE 2 | FACE 3 | FACE 4 | FACE 5 | FACE 6 | FACE 7 | FACE 8 |
|--------|--------|--------|--------|--------|--------|--------|--------|
| NODE A | NODE B | NODE B | NODE B | NODE A | NODE A | NODE A | NODE B |
| NODE B | NODE C | NODE D | NODE E | NODE B | NODE B | NODE B | NODE C |
|        |        |        |        | NODE C | NODE D | NODE E | NODE D |

| FACE 9 | FACE 10 | FACE 11 | FACE 12 | FACE 13 | FACE 14 | FACE 16 |
|--------|---------|---------|---------|---------|---------|---------|
| NODE B | NODE B  | NODE A  | NODE A  | NODE A  | NODE B  | NODE A  |
| NODE C | NODE D  | NODE B  | NODE B  | NODE B  | NODE C  | NODE B  |
| NODE E | NODE E  | NODE C  | NODE C  | NODE D  | NODE D  | NODE C  |
|        |         | NODE D  | NODE E  | NODE E  | NODE E  | NODE D  |
|        |         |         |         |         |         | NODE E  |

NODE C VIRTUAL INTERFACES
← 520

| FACE 1 | FACE 2 | FACE 3 | FACE 4 | FACE 5 | FACE 6 | FACE 7 | FACE 8 |
|--------|--------|--------|--------|--------|--------|--------|--------|
| NODE A | NODE B | NODE C | NODE C | NODE A | NODE A | NODE A | NODE B |
| NODE C | NODE C | NODE D | NODE E | NODE B | NODE C | NODE C | NODE C |
|        |        |        |        | NODE C | NODE D | NODE E | NODE D |

| FACE 9 | FACE 10 | FACE 11 | FACE 12 | FACE 13 | FACE 14 | FACE 16 |
|--------|---------|---------|---------|---------|---------|---------|
| NODE B | NODE C  | NODE A  | NODE A  | NODE A  | NODE B  | NODE A  |
| NODE C | NODE D  | NODE B  | NODE B  | NODE C  | NODE C  | NODE B  |
| NODE E | NODE E  | NODE C  | NODE C  | NODE D  | NODE D  | NODE C  |
|        |         | NODE D  | NODE E  | NODE E  | NODE E  | NODE D  |
|        |         |         |         |         |         | NODE E  |

FIG. 5A

NODE D VIRTUAL INTERFACES
530

| FACE 1 | FACE 2 | FACE 3 | FACE 4 | FACE 5 | FACE 6 | FACE 7 |
|--------|--------|--------|--------|--------|--------|--------|
| NODE B | NODE C | NODE D | NODE B | NODE B | NODE C | NODE B |
| NODE D | NODE D | NODE E | NODE C | NODE D | NODE D | NODE C |
|        |        |        | NODE D | NODE E | NODE E | NODE D |
|        |        |        |        |        |        | NODE E |

NODE E VIRTUAL INTERFACES
540

| FACE 1 | FACE 2 | FACE 3 | FACE 4 | FACE 5 | FACE 6 | FACE 7 |
|--------|--------|--------|--------|--------|--------|--------|
| NODE B | NODE C | NODE D | NODE B | NODE B | NODE C | NODE B |
| NODE E | NODE E | NODE E | NODE C | NODE D | NODE D | NODE C |
|        |        |        | NODE E | NODE E | NODE E | NODE D |
|        |        |        |        |        |        | NODE E |

FIG. 5B

METHOD AND APPARATUS FOR ESTABLISHING A VIRTUAL INTERFACE FOR A SET OF MUTUAL-LISTENER DEVICES

BACKGROUND

1. Field

This disclosure is generally related to computer networks. More specifically, this disclosure is related to a network node that creates a virtual interface for a set of mutual-listener devices that have a duplex communication with each other.

2. Related Art

Ad-hoc and multi-hop wireless networks allow mobile devices to communicate with remote devices outside their wireless range, without requiring a fixed network infrastructure. These mobile devices can modify their local network topology as new devices enter their coverage area, or as other devices leave their coverage area. Also, each wireless device can communicate with another device that is outside its direct coverage area by using a path that traverses various network peers.

Some devices in a wireless ad-hoc network may use a single link, such as a Wi-Fi radio, to communicate with other neighboring devices within its broadcast range. However, it is possible that some of these neighboring devices may not be within each other's broadcast range. Hence, if the network device needs to forward a packet between two neighboring nodes, the network device may need to forward the packet via the same link that was used to receive the packet, which can have the undesired effect of creating a forwarding loop.

SUMMARY

One embodiment provides a network device that facilitates creating a virtual interface for a set of mutual-listener devices that have a duplex communication with each other. During operation, the network device can receive a packet, and identifies a virtual interface to which the packet is directed. The virtual interface's set of members can include a set of mutually-connected network peers. The network device can determine whether the local network device is a member of the virtual interface, and if so, processes the packet as an intended recipient of the packet.

In some embodiments, the network device can obtain duplex-neighborhood information from one or more network neighbors, and defines one or more virtual interfaces based on the duplex-neighborhood information. A neighbor's duplex-neighborhood information can indicate at least a set of neighboring devices to the network neighbor. A respective virtual interface's member nodes can include the local network node and a set of mutually-connected network peers.

In some embodiments, the network device can generate an interface identifier for a respective virtual interface. For example, the network device can generate the interface identifier by computing a hash value for device identifiers that belong to the virtual interface, and constructing a bloom filter for the device identifiers that belong to the virtual interface.

In some embodiments, the network device can identify the virtual interface by obtaining an interface identifier from the packet's header. Also, the network device can determine whether the local network device is a member of the identified virtual interface by comparing the interface identifiers to a set of pre-computed identifiers.

In some variations on these embodiments, the interface identifier includes one or more of: a hash computed from a set of device identifiers for members of the virtual interface; and an identifier pre-negotiated between the members of the virtual interface.

In some embodiments, the network device can identify the virtual interface by obtaining a bloom filter from the packet's header. The bloom filter may be generated based on device identifiers for members of a virtual interface. Also, while determining whether the local network device is a member of the identified virtual interface, the network device can query the bloom filter, using device identifiers for a set of network neighbors of the local network node, to determine a set of device identifiers that are members of the bloom filter. The network device then determines a virtual interface that corresponds to the determined set of device identifiers.

In some embodiments, the network device can identify the virtual interface involves obtaining a set of device identifiers from the packet's header. Also, the network device can determine that the local network device is a member of the target interface by verifying that the local device is a member of the packet header's set of device identifiers and/or verifying that the network peers associated with the device identifiers are duplex neighbors of the local network node.

In some embodiments, the network device can monitor packets transmitted by one or more network peers to detect a change in a network neighborhood. The network device also determines a set of mutual-listener groups in the network neighborhood, and determines a set of virtual interfaces to which the local network node is a member. The network device can then activate the determined set of virtual interfaces.

In some embodiments, the network device can transmit a packet to negotiate a device membership for one or more virtual interfaces. The packet can include one or more of: a set of network peers for the local network node; a set of virtual interfaces to which the local network node is a member; a bloom filter of the network peers; and a bloom filter of the virtual interfaces.

One embodiment provides a network device that facilitates using a virtual interface to send packets to a remote device. During operation, the network device can generate a packet for a remote device, and determines a next-hop destination for the packet. The network device can also determine a virtual interface for the next-hop destination, based on neighborhood connectivity information for the next-hop destination. To send the packet to the next-hop node, the local network device sets the virtual interface and an identifier for the next-hop destination in the packet, and sends the packet via the virtual interface.

In some embodiments, the next-hop destination includes one or more of a network node, a set of network nodes, an anycast address, and a broadcast address.

In some embodiments, the network device determines the virtual interface based on one or more of: historical usage information for one or more virtual interfaces associated with the next-hop destination; a change to neighborhood connectivity information since a packet was last sent to the next-hop destination; and a change to neighborhood connectivity information since a packet was last sent to the virtual interface.

BRIEF DESCRIPTION OF THE FIGURES

FIG. 4 illustrates exemplary adjacency tables for a set of network nodes in accordance with an embodiment.

FIGS. 5A and 5B illustrate exemplary virtual interfaces for a set of network nodes in accordance with an embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of establishing virtual links for groups of duplex neighbors of a wireless network. For example, in a content centric network (CCN), a network device is not allowed to forward a packet via a face (e.g., a physical or virtual interface) from which it received the packet as a way to avoid forwarding loops. However, in a typical ad-hoc wireless network, it may be necessary for a device to relay a packet via the same interface when the packet's sender and intended recipient are connected via this same interface.

In some embodiments, each face is defined to only include a set of duplex neighbors that can listen to each other's packets. This way, when the device receives a packet via a given face, it is not necessary for the device to forward the packet to any device associated with this face. If the packet's intended recipient happens to be member of this face, the network device can assume that the packet has already reached its destination and ignores the packet.

A network device can send a packet via a given face by including an identifier for the face in the packet's header. The device's duplex neighbors can analyze the packet's header to determine whether they are members of the face. Any duplex neighbor that is a member of the face can process the packet, such as to consume the packet, or to forward the packet across another face.

The following terms describe embodiments of the present invention:

Face: A face includes a physical interface or a virtual interface of a network node. The terms "face" and "virtual interface" are used interchangeably hereinafter.

Duplex neighbors: A network node's duplex neighbors include a set of devices from which the network node can receive packets directly, and that can receive packets directly from the network node.

Two-hop duplex neighborhood: A network node's two-hop duplex neighborhood includes the set of duplex neighbors for each of the network node's duplex neighbors. The network node can receive duplex-neighborhood information from each of its duplex neighbors, which the network node uses to determine its two-hope duplex neighborhood.

Mutual listeners: The mutual listeners of a face include a set of first-hop duplex neighbors that can each send and receive packets directly to/from each other.

Figure 1:
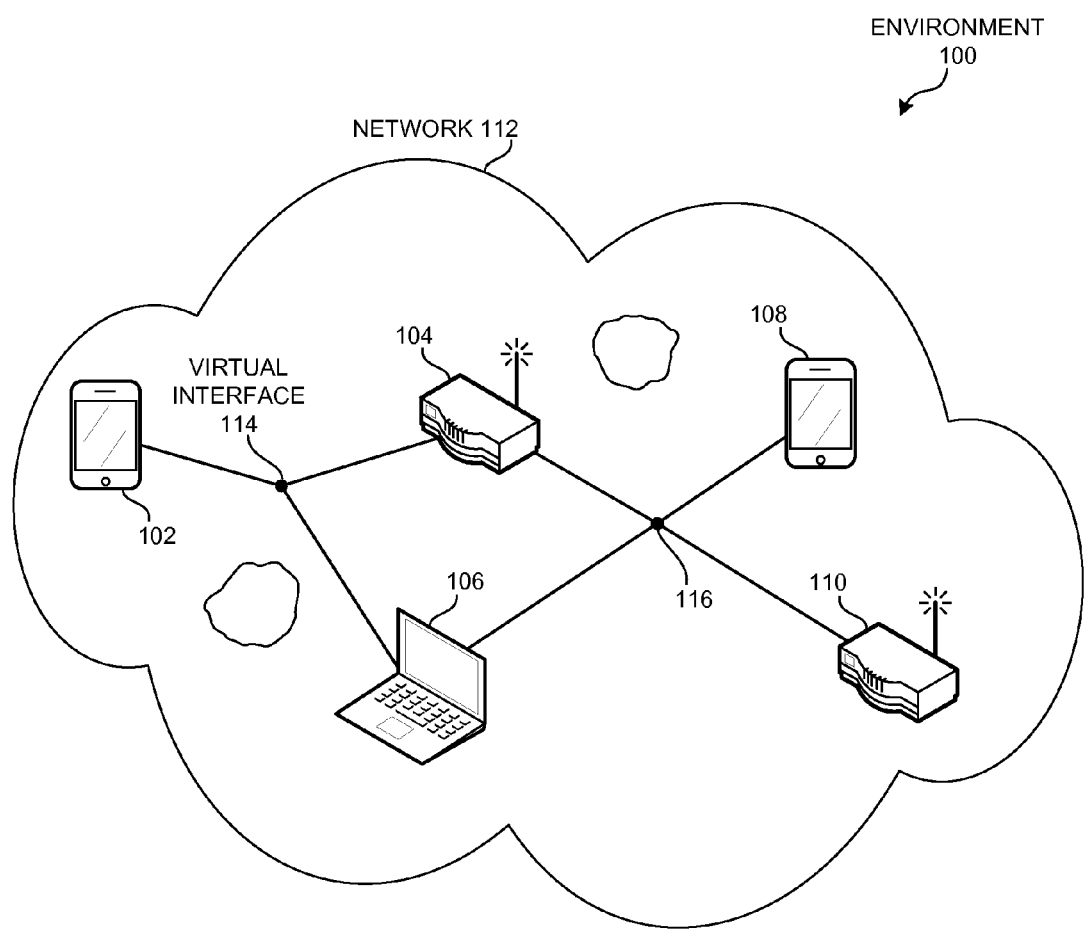
FIG. 1 illustrates an exemplary computing environment that facilitates establishing and communicating over virtual interfaces for various mutual-listener network neighborhoods in accordance with an embodiment.

FIG. 1 illustrates an exemplary computing environment 100 that facilitates establishing and communicating over virtual interfaces for various mutual-listener network neighborhoods in accordance with an embodiment. Computer environment 100 can include a plurality of network nodes that communicate over a shared network 112, such as an ad-hoc or multi-hop wireless network.

During operation, the network devices of network 112 can use a wireless channel to form an ad-hoc or multi-hop wireless network by dynamically creating and tearing down virtual interfaces for the wireless network as necessary. More specifically, each network device can automatically detect a set of neighboring nodes, and clusters these neighboring nodes into groups of mutual-listener nodes. This allows each network device to autonomously create a virtual interface without having to explicitly negotiate the member nodes of the virtual interface with other network nodes of network 112.

For example, network nodes 104 and 106 may have a direct duplex network connection with each other, as well as network devices 102, 108, and 110. Also, network devices 108 and 110 may have a direct duplex network connection with each other, but do not have a direct duplex network connection to network device 102. In some embodiments, these devices of network 112 can exchange duplex-neighborhood information with each other (e.g., an adjacency table) that identifies a network device's set of neighboring nodes.

Because network devices 102, 104, and 106 can listen to each other over network 112, they are able to obtain duplex-neighborhood information from each other. Network device 102, 104, and 106 each independently analyzes each other's duplex-neighborhood information to determine that they can form a group of mutual listeners, and each proceeds to establish a local virtual link 114 for the mutual-listener group. Each mutual-listener group, and its corresponding virtual link, includes a set of devices that each has a duplex network connection with each other device in the mutual-listener group.

Similarly, devices 104, 106, 108, and 110 can listen to each other over network 112 to obtain duplex-neighborhood information from each other. Devices 104, 106, 108, and 110 analyze each other's duplex-neighborhood information to determine that they can form a mutual-listener group, and each establishes a local virtual link 116 for the mutual-listener group. Once the devices of network 112 have each created one or more virtual links, they can use these virtual links to forward packets across network 112 without sending the packet to any device from which the packet was received.

For example, network device 108 can communicate a packet that is directed to network devices 102 and 110, and whose header includes an identifier for virtual interface 116. Network device 104 can receive the packet from device 108, and analyzes the packet's header to determine that the packet arrived through virtual interface 116. However, because virtual interface 116 includes devices { 104, 106, 108, and 110} that can each receive each other's packets, network device 104 determines that device 110 has already received the packet from device 108, and proceeds to send the packet to device 102 via virtual link 114. When device 104 forwards the packet via virtual link 114, device 104 can include an identifier for virtual link 114 that prevents the packet from flowing back to device 108. Device 108 can detect the forwarded packet over network 112, but ignores the packet after determining that device 108 is not a member of virtual interface 114.

Figure 2:
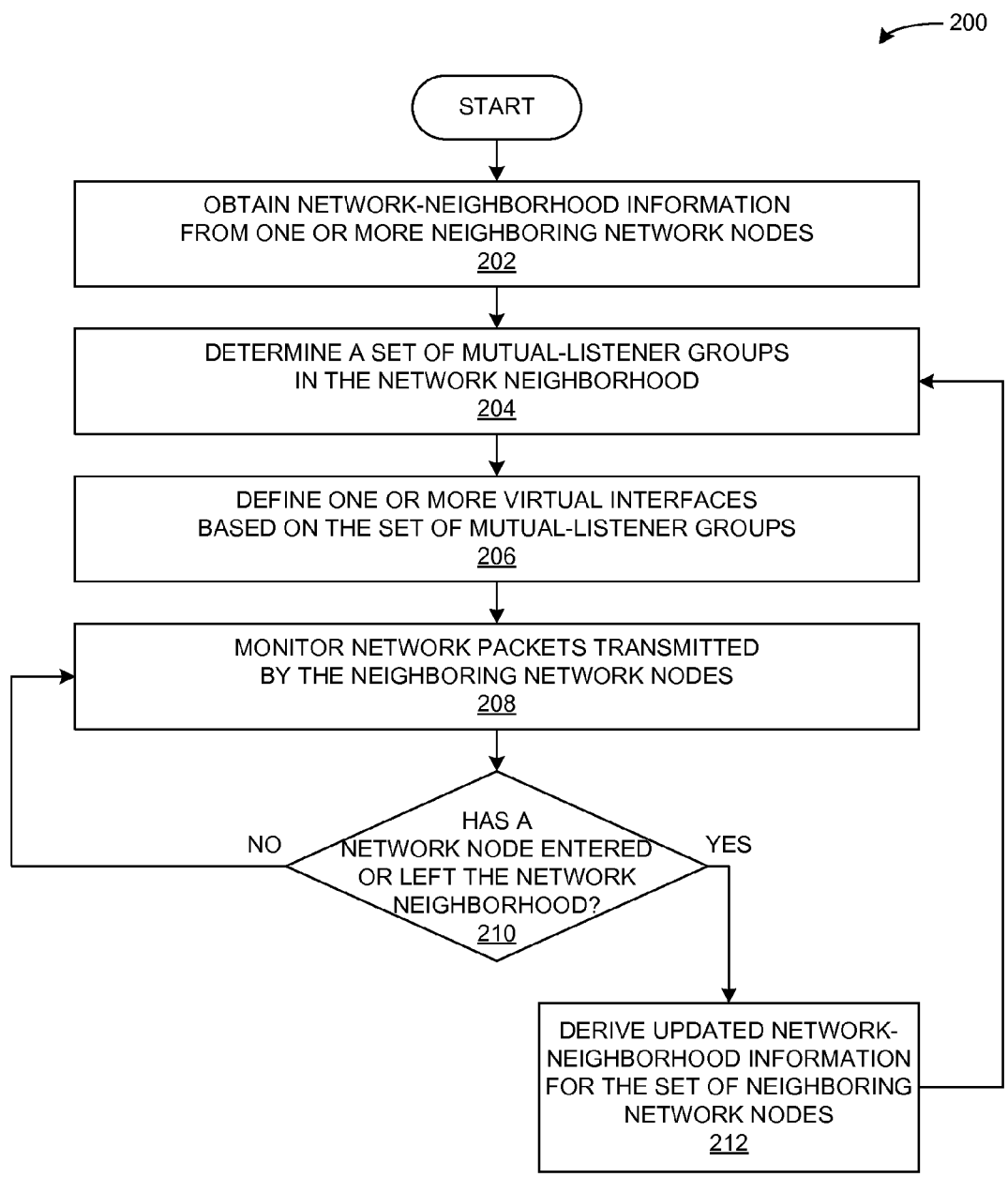
FIG. 2 presents a flow chart illustrating a method for establishing and maintaining a set of virtual interfaces that each corresponds to a neighborhood of mutual-listener network nodes in accordance with an embodiment.

FIG. 2 presents a flow chart illustrating a method for establishing and maintaining a set of virtual interfaces at a network device in accordance with an embodiment. Specifically, each virtual interface corresponds to a neighborhood of mutual-listener network nodes over a wireless network. During operation, the network device obtains duplex-neighborhood information from one or more neighboring network nodes (operation 202), and determines a set of mutual-listener groups in the network neighborhood (operation 204). The duplex-neighborhood information can include, for example, a list of device that can transmit and receive packets to/from a given network node. Each mutual-listener group can include a set of duplex network nodes that can transmit and/or receive packets to/from each other. The network device then creates one or more virtual interfaces based on the set of mutual-listener groups (operation 206).

In some embodiments, the system creates a virtual interface for any combination of mutual-listener groups, while allowing for a device overlap between pairs of virtual interfaces. In some other embodiments, the system determines a minimum set of mutual-listener groups that encompasses the full set of neighboring nodes, and uses these mutual-listener groups to create a set of virtual interfaces that do not include an overlap in device memberships.

The network device can also update the set of virtual interfaces to accommodate a new neighboring node, or to account for a network node that has left the device's neighborhood. For example, the network device can monitor network packets that are being transmitted by the neighboring network nodes (operation 208), regardless of whether the local network node is a member of the packet's virtual interface. The network device then analyzes the packet's header to determine whether a network node has entered or left the network neighborhood (operation 210). The network device may detect that a node has entered the local neighborhood when the network device receives a packet from the new node, and does not recognize the new node as a known neighbor.

The network device can also detect that a given node has left the local neighborhood by analyzing a packet's header to determine a change in a mutual-listener group. When the network device receives a packet from a known neighbor, the network device can detect whether the packet's header includes a new virtual-interface identifier, or whether the packet's header excludes a network node that was expected to be included in the header.

Figure 3:
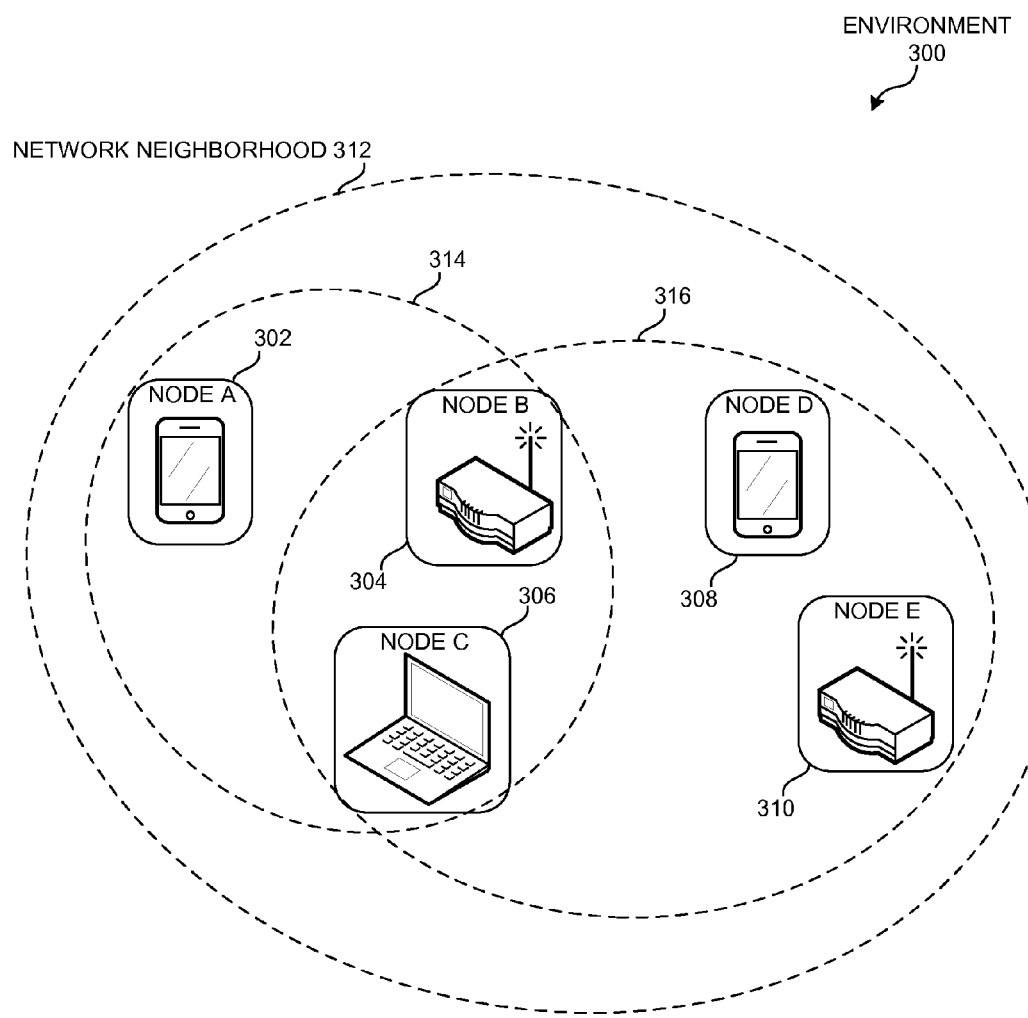
FIG. 3 illustrates exemplary network neighborhoods for a set of wireless network nodes in accordance with an embodiment.

FIG. 3 illustrates exemplary network neighborhoods for a set of wireless network nodes within a computing environment 300 in accordance with an embodiment. Computing environment 300 can include a wireless network with mobile computing devices 302 (labelled "Node A") and 308 (labelled "Node D"), as well as a laptop 306 (labelled "Node C"). Computing environment 300 can also include wireless access points 304 and 310 (labelled "Node B" and "Node E," respectively). Specifically, AP 304 and laptop 306 may have a network neighborhood 312, which allows both AP 304 and laptop 306 to have duplex communication with mobile devices 302 and 308, as well as with AP 310.

Mobile device 302 may have a network neighborhood 314 that includes AP 304 and laptop 306, which allows mobile device 302 to have a duplex communication with AP 304 and laptop 306. Also, mobile device 308 and AP 310 have a network neighborhood 316 that allows device 308 and AP 310 to have a duplex communication with AP 304 and laptop 306. However, mobile device 302 may not have a duplex communication with either mobile device 308 or AP 310. Mobile device 302 can detect packets that AP 304 or laptop 306 transmits for mobile device 308 or AP 310 via a virtual interface for neighborhood 316, but mobile device 302 ignores these packets upon realizing that mobile device 302 is not a member of neighborhood 316.

If mobile device 302 moves toward device 308 so that device 308 is within network neighborhood 314 for mobile device 302, it is possible that mobile devices 302 and 308 will start detecting each other's packets. At this point, mobile devices 302 and 308 can each update their local network neighborhood to include each other. In some embodiments, mobile devices 302 and 308 may also infer each other's duplex-neighborhood information by analyzing each other's network packets. Mobile devices 302 and 308 can obtain virtual interface identifiers from each other's packets, and analyze these identifiers to infer an overlap in each other's network neighborhoods. Alternatively, mobile devices 302 and 308 can exchange their duplex-neighborhood information directly, and can perform a cross-comparison between their neighboring network nodes to determine an overlap in each other's network neighborhood.

In some embodiments, a network node (e.g., mobile device 302) can initiate a process to discover new neighboring nodes by sending a packet that requests updated neighborhood information from any neighboring network nodes that can detect the packet. These neighboring nodes update their neighborhood information (e.g., in an adjacency table, or any other data structure), and return their updated neighborhood information to the network node. The network node can update its duplex-neighborhood information to include nodes that have responded, and uses the updated neighborhood information to redefine its local virtual interfaces (if necessary). The network node can also return its updated neighborhood information to the neighboring nodes.

FIG. 4 illustrates exemplary adjacency tables for a set of network nodes in accordance with an embodiment. Specifically, adjacency table 400 for Node A indicates that Node A has neighbors Node B and Node C. Adjacency table 410 for Node B indicates that Node B has neighbors Node A, Node C, Node D, and Node E. Note that adjacency table 420 for Node C includes the same set of nodes as adjacency table 410 for Node B, which implies that Node B and Node C are part of the same network neighborhood. Node C's neighborhood includes Node B, and includes Node B's neighbors (Node A, Node D, and Node E).

Also note that adjacency table 430 for Node D includes the same set of nodes as adjacency table 440 for Node E, which implies that Node D and Node E are part of the same neighborhood. Node D's neighborhood includes Node E, as well as Node E's other neighbors (Node B, Node C). Node E's neighborhood includes Node D, and also includes Node D's other neighbors (Node B and Node C).

In some embodiments, each network node can use the local duplex-neighborhood information to generate a set of candidate virtual interfaces. Also, the network node can select a subset of virtual interfaces to activate. For example, a network node can partition its neighboring nodes into one or more groups of mutual-listener nodes, and activates a virtual interface for each mutual-listener group.

FIGS. 5A and 5B illustrate exemplary virtual interfaces for a set of network nodes in accordance with an embodiment. Specifically, the full set of virtual interfaces 500 for Node A can include three possible combinations based on neighboring network nodes A and B. In some embodiments, Node A can select Face 3 to activate, which corresponds to the only mutual-listener group for Node A (e.g., network neighborhood 314 of FIG. 3).

The full set of virtual interfaces 510 for Node B can include fifteen possible combinations based on neighboring network nodes A, C, D, and E. In some embodiments, Node B can select Face 5 and Face 14 to activate, which together cover the full set of neighbor nodes for Node B. Face 5 corresponds to the mutual-listener group {A, B, C} (e.g., network neighborhood 314 of FIG. 3), and Face 14 corresponds to the mutual-listener group {B, C, D, E} (e.g., network neighborhood 316 of FIG. 3). Virtual interfaces 520 for Node C can also include fifteen possible combinations based on neighboring network nodes A, B, D, and E. Note that Node C belongs to the same network neighborhood as Node B, which causes Node C to also select Face 5 and Face 14 to activate.

The full set of virtual interfaces 530 for Node D can include seven possible combinations based on neighboring network nodes B, C, and E. In some embodiments, Node D can select Face 7 to activate, which corresponds to the only mutual-listener group for Node D (e.g., network neighborhood 316 of FIG. 3). Virtual interfaces 540 for Node E can also include seven possible combinations based on neighboring network nodes B, C, and D. Note that Node E belongs to the same network neighborhood as Node D, which causes Node E to also select Face 7 to activate.

In some embodiments, each network node can generate or derive a virtual-interface identifier for each candidate virtual interface. For example, nodes B may generate fifteen virtual-interface identifiers—one for each of candidate virtual interfaces 510. The identifier for a given virtual interface can include, for example, a hash value computed from device identifiers for the member devices of the virtual interface. Alternatively, the identifier can include any other value that is randomly generated, or is computed based on the virtual interface's set of member devices. The network device can also generate a table that includes the set of pre-computed virtual-interface identifier, such that each table entry maps the virtual-interface identifier to a set of device names for the virtual interface's set of member devices. This allows the network node to determine whether it is a member of a virtual interface by performing a lookup operation in the table. In some other embodiments, each network node may generate or derive a virtual-interface identifier only for the virtual interfaces that have been activated.

In some embodiments, network devices can send a packet over a wireless network by indicating a virtual-interface identifier in the packet's header. The virtual-interface identifier allows other network devices to determine whether they are members of the same virtual interface that is being used to communicate the packet.

Figure 6:
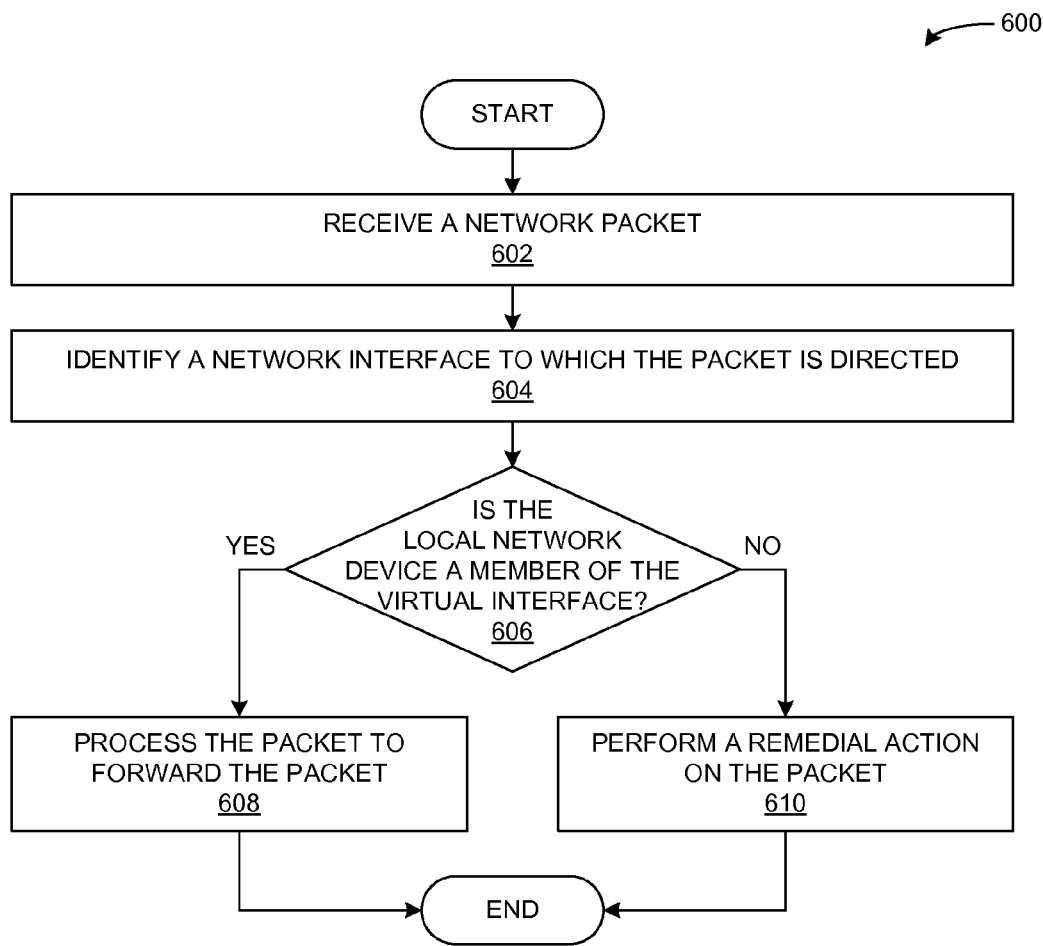
FIG. 6 presents a flow chart illustrating a method for processing a packet received over a virtual interface for a set of mutual-listener network neighborhood in accordance with an embodiment.

FIG. 6 presents a flow chart illustrating a method 600 for processing a packet received over a virtual interface for a set of mutual-listener network neighborhood in accordance with an embodiment. During operation, the network device can receive a network packet (operation 602), and identifies a network interface to which the packet is directed (operation 604). For example, the virtual-interface identifier can include a set of device identifiers for network devices that belong to a mutual-listener group. Alternatively, the virtual-interface identifier can include a hash of the set of device identifiers, or can include a bloom filter that was generated based on the set of device identifiers.

The network device then determines whether it is a member of the identified virtual interface (operation 606). For example, if the virtual-interface identifier includes a set of device identifiers, the local network device can determine whether the network device is a member of the interface by determining whether the network device's identifier is included in the set of device identifiers. On the other hand, if the virtual-interface identifier includes a hash value for the set of device identifiers, the local device can use the hash value to perform a lookup on a table of candidate virtual interfaces. If the local network device finds a match, the network device can conclude that the local network device is a member of the packet's virtual interface. The network device can also use the matching entry to determine a set of neighboring network nodes that are members of the virtual interface. On the other hand, if the virtual-interface includes a bloom filter, the local network device can query the bloom filter using device identifiers found in the duplex-neighborhood information for the local network node, as well as for all neighboring nodes. The device identifiers that result in a hit on the bloom filter correspond to the set of network nodes that are members of the virtual interface identified by the packet.

If the network device is a member of the identified virtual interface, the network device can proceed to process the packet as an intended recipient for the packet. For example, the network node can include a content-centric networking (CCN) device, and the packet can include an Interest or a Content Object. If the network packet includes an Interest, the network device can perform a lookup operation on a Forwarding Information Base (FIB) to determine another virtual interface to use to forward the Interest packet. On the other hand, if the packet includes a Content Object, the network device can perform a lookup operation on a Pending Interest Table (PIT) to determine another virtual interface to use to forward the Content Object. The network device can also perform other operations on the packet, such as to cache the packet's payload (e.g., a Content Object).

On the other hand, if the local network device is not a member of the virtual interface identified in the packet's header, the network device can perform a remedial action (operation 610). The remedial action can include, for example, ignoring the packet, or caching the packet's payload (e.g., without forwarding the packet). The remedial action can also include using the virtual-interface identifier in the packet's header to update duplex-neighborhood information for the neighboring node that sent the packet.

Figure 7A:
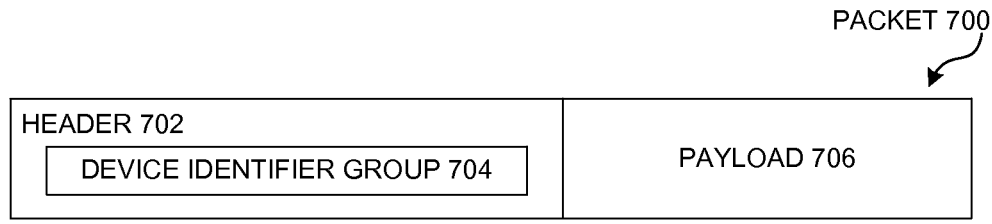
FIG. 7A illustrates a packet that identifies a virtual interface using a set of network device identifiers in accordance with an embodiment.

FIG. 7A illustrates a packet 700 that identifies a virtual interface using a set of network device identifiers in accordance with an embodiment. Specifically, packet 700 includes a payload 706, and includes a header 702 that carries a set of network device identifiers 704. A network device that receives packet 700 can use device identifier 704 as a virtual-interface identifier by searching for a local virtual interface whose set of member devices matches device identifiers 704. The network device can also determine whether it is a member of the virtual interface by determining whether device identifier 704 includes an identifier for the local network device.

Figure 7B:
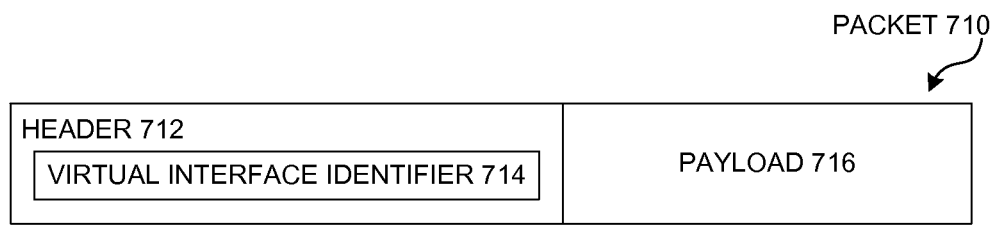
FIG. 7B illustrates a packet that identifies a virtual interface using a virtual-interface identifier in accordance with an embodiment.

FIG. 7B illustrates a packet 710 that identifies a virtual interface using a virtual-interface identifier in accordance with an embodiment. Packet 710 includes a payload 716, and includes a header 712 that carries an explicit virtual-interface identifier 714. In some embodiments, a group of mutual-listener devices can agree on an identifier for a virtual interface that corresponds to the group. Virtual-interface identifier 724 can include a numeric value, an alpha-numeric value, or any other logical value now known or later developed. In some other embodiments, each device in the group of mutual-listener devices can derive an identifier for the virtual interface, so that the identifier for the virtual interface is common across the group.

Figure 7C:
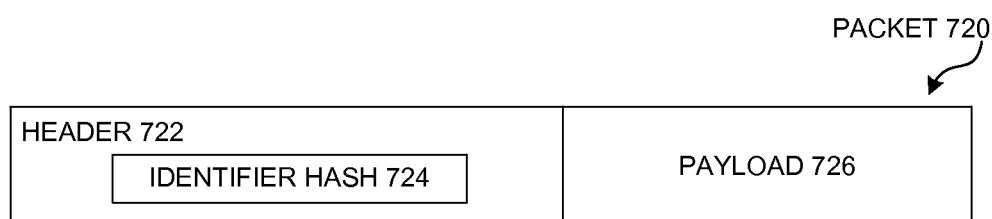
FIG. 7C illustrates a packet that identifies a virtual interface using a hash value for a set of network device identifiers in accordance with an embodiment.

FIG. 7C illustrates a packet that identifies a virtual interface using a hash value for a set of network device identifiers in accordance with an embodiment. Packet 720 includes a payload 726, and includes a header 722 that carries a hash identifier 724 for a virtual interface. Each device in the group of mutual-listener devices can generate an identifier for a virtual interface to the group by computing a hash of the group's device identifiers. This allows the virtual interface to have the same identifier across the mutual-listener group. When a device receives packet 720 from a neighboring node, the device can compare hash identifier 724 to a set of pre-computed hash values to determine which virtual interface was used to send the packet, and to determine the set of neighboring nodes that are members of the virtual interface.

Figure 7D:
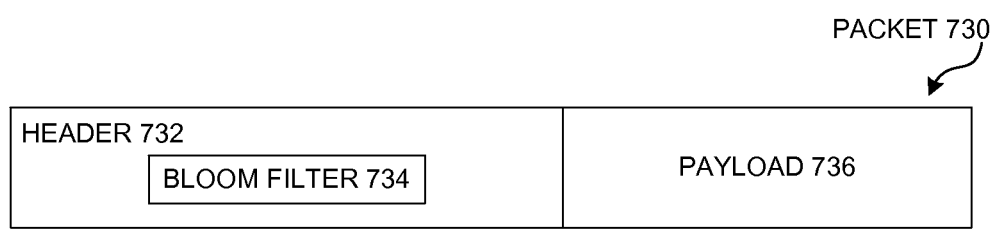
FIG. 7D illustrates a packet that identifies a virtual interface using a bloom filter in accordance with an embodiment.

FIG. 7D illustrates a packet 730 that identifies a virtual interface using a bloom filter in accordance with an embodiment. Packet 730 includes a payload 736, and includes a header 732 that carries a bloom filter 734 for a virtual interface. A Bloom filter is a space-efficient data structure typically used to determine whether an element (e.g., a device identifier) is a member of a set. In this disclosure, the "set" is the group of mutual-listener neighbors that are members of a virtual interface. Hence, the problem of determining whether a network device is a member of a virtual interface is equivalent to determining whether the device's identifier is a member of bloom filter 734. With a Bloom filter, false positives are possible, but false negatives are not.

There are also k different hash functions, each of which maps or hashes a respective element (e.g., a device identifier) to one of the m array positions with a uniform random distribution. An empty Bloom filter is a bit array of m bits, all set to 0. A network device can generate a bloom filter for a virtual interface by feeding each device identifier of the virtual interface to each of the k hash functions, and obtain k array positions for each device identifier. The system sets these array positions of the bloom filter to 1.

A network device that receives packet 730 can query the bloom filter to determine which known device identifiers are members of the virtual interface. For example, the network device can use a set of identifiers for one-hop and two-hop neighbors, which can be obtained from adjacency tables for all one-hop neighbors. Once the local device determines which group of devices are members of the virtual interface, the local device can use this device group to determine whether it is a member of the virtual interface, and to determine which other members have received the packet.

To query whether a device identifier is in the set, the network device can feed the device identifier to each of the k hash functions to obtain k array positions. If any of the bits at these positions are 0, then the device identifier is not in the set. This is because if the device identifier was a member of the set, then all the k bits would have been set to 1 when the device identifier was inserted to the set. If all are 1, then either the device identifier is in the set, or the bits have been set to 1 during the insertion of other elements (which is a false positive).

Figure 8:
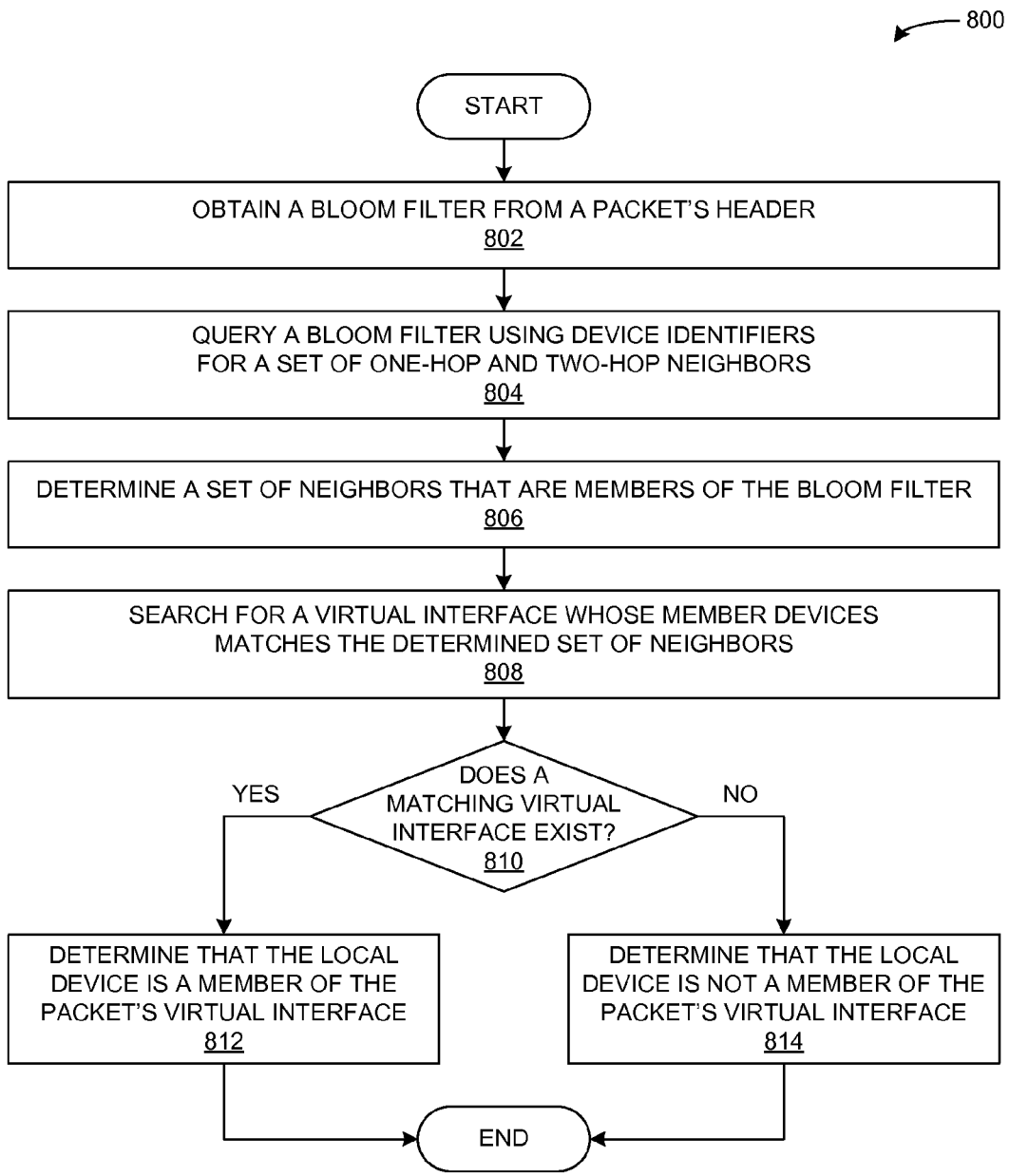
FIG. 8 presents a flow chart illustrating a method for using a bloom filter to determine whether the local network device is a member of a packet's target virtual interface in accordance with an embodiment.

FIG. 8 presents a flow chart illustrating a method for using a bloom filter to determine whether the local network device is a member of a packet's target virtual interface in accordance with an embodiment. During operation, the network device can obtain a bloom filter from a packet's header (operation 802), and queries the bloom filter using device identifiers for a set of one-hop and two-hop neighboring nodes (operation 804). The network device then determines a set of neighboring network nodes that are members of the bloom filter (operation 806), and searches for a virtual interface whose member devices matches the determined set of network nodes (operation 808).

The system then determines whether a matching virtual interface exists (operation 810). If so, the system determines that the local network device is a member of the packet's target virtual interface (operation 812). Otherwise, the system determines that the local network device is not a member of the packet's target virtual interface (operation 814).

Figure 9:
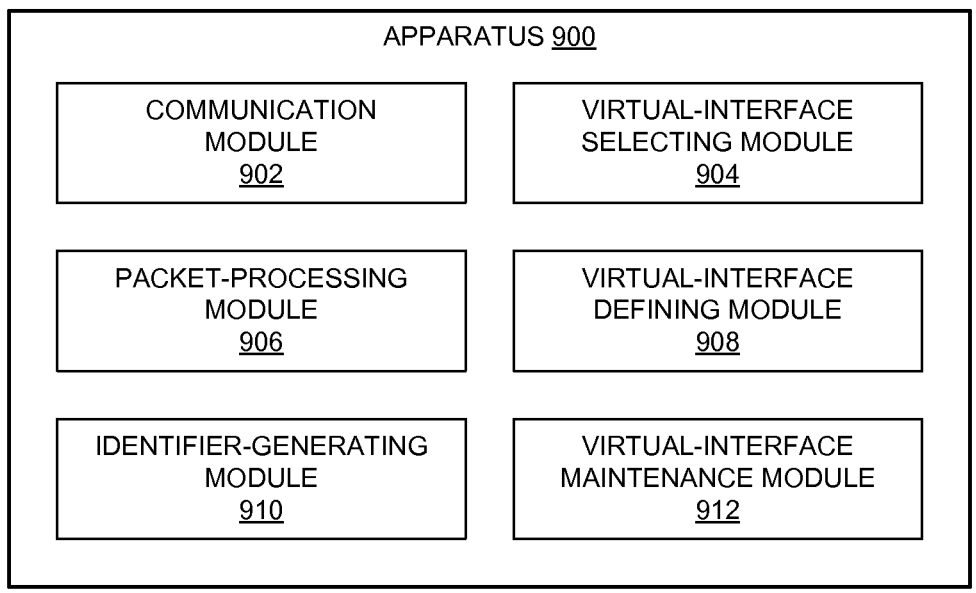
FIG. 9 illustrates an exemplary apparatus that facilitates establishing and communicating over virtual interfaces for various mutual-listener network neighborhoods in accordance with an embodiment.

FIG. 9 illustrates an exemplary apparatus 900 that facilitates establishing and communicating over virtual interfaces for various mutual-listener network neighborhoods in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a communication module 902, a virtual-interface selecting module 904, a packet-processing module 906, a virtual-interface defining module 908, an identifier-generating module 910, and a virtual-interface maintenance module 912.

In some embodiments, communication module 902 can receive a packet, and virtual-interface selecting module 904 can determine whether the local network device is a member of the virtual interface. Packet-processing module 906 can process the packet in response to determining that the local network device is a member of the virtual interface.

Virtual-interface defining module 908 can define one or more virtual interfaces based on duplex-neighborhood information from one or more network neighbors, and identifier-generating module 910 can generate an interface identifier for a respective virtual interface. Virtual-interface maintenance module 912 can monitor packets transmitted by one or more network peers to detect a change in a network neighborhood, and activates a virtual interface associated with a new mutual-listener group.

Figure 10:
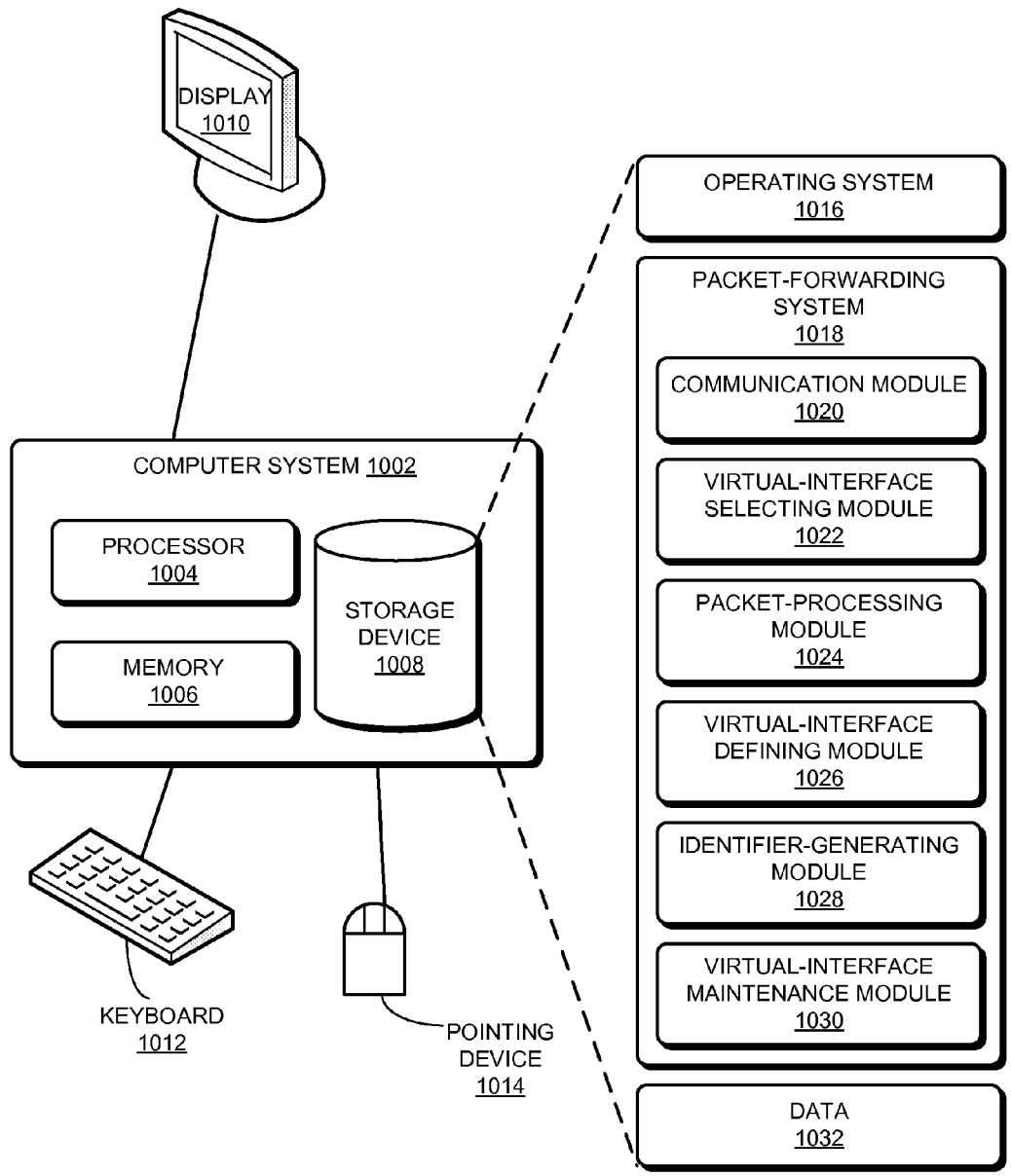
FIG. 10 illustrates an exemplary computer system that facilitates establishing and communicating over virtual interfaces for various mutual-listener network neighborhoods in accordance with an embodiment.

FIG. 10 illustrates an exemplary computer system 1002 that facilitates establishing and communicating over virtual interfaces for various mutual-listener network neighborhoods in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, an interface-maintenance system 1018, and data 1032.

Interface-maintenance system 1018 can include instructions, which when executed by computer system 1002, can cause computer system 1002 to perform methods and/or processes described in this disclosure. Specifically, interface-maintenance system 1018 may include instructions for receiving a packet (communication module 1020). Further, interface-maintenance system 1018 can include instructions for determining whether the local network device is a member of the virtual interface (virtual-interface selecting module 1022), and can include instructions for processing the packet in response to determining that the local network device is a member of the virtual interface (packet-processing module 1024).

Interface-maintenance system 1018 can include instructions for defining one or more virtual interfaces based on duplex-neighborhood information from one or more network neighbors (virtual-interface defining module 1026), and can include instructions for generating an interface identifier for a respective virtual interface (identifier-generating module 1028). Interface-maintenance system 1018 can also include instructions for monitoring packets transmitted by one or more network peers to detect a change in a network neighborhood, and activating a virtual interface associated with a new mutual-listener group (virtual-interface maintenance module 1030).

Data 1032 can include any data that is required as input or that is generated as output by the methods and/or processes described in this disclosure. Specifically, data 1032 can store at least identifiers for one or more virtual interfaces, and duplex-neighborhood information for a set of neighboring network nodes.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   obtaining, by a network device, duplex-neighborhood information from one or more network neighbors, wherein a network neighbor's duplex-neighborhood information indicates at least a set of neighboring devices to the network neighbor;
   defining one or more virtual interfaces based on the duplex-neighborhood information, wherein a respective virtual interface's member nodes include the local network node and a set of mutually-connected network peers;
   receiving, by the network device, a packet;
   identifying a virtual interface to which the packet is directed, wherein members of the virtual interface include a set of mutually-connected network peers;
   determining whether the local network device is a member of the virtual interface; and
   in response to determining that the local network device is a member of the virtual interface, processing the packet as an intended recipient of the packet.

2. The method of claim 1, further comprising generating an interface identifier for a respective virtual interface, wherein generating the interface identifier involves one or more of:
   computing a hash value for device identifiers that belong to the virtual interface; and
   constructing a bloom filter for the device identifiers that belong to the virtual interface.

3. The method of claim 1, wherein identifying the virtual interface involves obtaining an interface identifier from the packet's header; and
   wherein determining whether the local network device is a member of the identified virtual interface involves comparing the interface identifiers to a set of pre-computed identifiers.

4. The method of claim 3, wherein the interface identifier includes one or more of:
   a hash computed from a set of device identifiers for members of the virtual interface; and
   an identifier pre-negotiated between the members of the virtual interface.

5. The method of claim 1, wherein identifying the virtual interface involves obtaining a bloom filter from the packet's header, wherein the bloom filter is generated based on device identifiers for members of a virtual interface, and wherein determining whether the local network device is a member of the identified virtual interface involves:
   querying the bloom filter, using device identifiers for a set of network neighbors of the local network node, to determine a set of device identifiers that are members of the bloom filter; and
   determining a virtual interface that corresponds to the determined set of device identifiers.

6. The method of claim 1, wherein identifying the virtual interface involves obtaining a set of device identifiers from the packet's header, and wherein determining that the local network device is a member of the target interface involves one or more of:
   verifying that the local device is a member of the packet header's set of device identifiers; and
   verifying that the network peers associated with the device identifiers are duplex neighbors of the local network node.

7. The method of claim 1, further comprising:
   monitoring packets transmitted by one or more network peers to detect a change in a network neighborhood;
   determining a set of mutual-listener groups in the network neighborhood;

determining a set of virtual interfaces to which the local network node is a member; and activating the determined set of virtual interfaces.

8. The method of claim 1, further comprising transmitting a packet to negotiate a device membership for one or more virtual interfaces, wherein the packet includes one or more of:
   a set of network peers for the local network node;
   a set of virtual interfaces to which the local network node is a member;
   a bloom filter of the network peers; and
   a bloom filter of the virtual interfaces.

9. A non-transitory computer-readable storage medium storing instructions that when executed by a computer cause the computer to perform a method, the method comprising:
   obtaining duplex-neighborhood information from one or more network neighbors, wherein a network neighbor's duplex-neighborhood information indicates at least a set of neighboring devices to the network neighbor;
   defining one or more virtual interfaces based on the duplex-neighborhood information, wherein a respective virtual interface's member nodes include the local network node and a set of mutually-connected network peers;
   receiving a packet;
   identifying a virtual interface to which the packet is directed, wherein members of the virtual interface include a set of mutually-connected network peers;
   determining whether the local network device is a member of the virtual interface; and
   in response to determining that the local network device is a member of the virtual interface, processing the packet as an intended recipient of the packet.

10. The storage medium of claim 9, the method further comprising generating an interface identifier for a respective virtual interface, wherein generating the interface identifier involves one or more of:
    computing a hash value for device identifiers that belong to the virtual interface; and
    constructing a bloom filter for the device identifiers that belong to the virtual interface.

11. The storage medium of claim 9, wherein identifying the virtual interface involves obtaining an interface identifier from the packet's header; and
    wherein determining whether the local network device is a member of the identified virtual interface involves comparing the interface identifiers to a set of pre-computed identifiers.

12. The storage medium of claim 11, wherein the interface identifier includes one or more of:
    a hash computed from a set of device identifiers for members of the virtual interface; and
    an identifier pre-negotiated between the members of the virtual interface.

13. The storage medium of claim 9, wherein identifying the virtual interface involves obtaining a bloom filter from the packet's header, wherein the bloom filter is generated based on device identifiers for members of a virtual interface, and wherein determining whether the local network device is a member of the identified virtual interface involves:
    querying the bloom filter, using device identifiers for a set of network neighbors of the local network node, to determine a set of device identifiers that are members of the bloom filter; and
    determining a virtual interface that corresponds to the determined set of device identifiers.

14. The storage medium of claim 9, wherein identifying the virtual interface involves obtaining a set of device identifiers from the packet's header, and wherein determining that the local network device is a member of the target interface involves one or more of:
    verifying that the local device is a member of the packet header's set of device identifiers; and
    verifying that the network peers associated with the device identifiers are duplex neighbors of the local network node.

15. The storage medium of claim 9, the method further comprising:
    monitoring packets transmitted by one or more network peers to detect a change in a network neighborhood;
    determining a set of mutual-listener groups in the network neighborhood;
    determining a set of virtual interfaces to which the local network node is a member; and
    activating the determined set of virtual interfaces.

16. A computer-implemented method, comprising:
    generating, by a network device, a packet for a remote device;
    determining a next-hop destination for the packet;
    determining a virtual interface for the next-hop destination, based on neighborhood connectivity information for the next-hop destination, and based on one or more of:
       historical usage information for one or more virtual interfaces associated with the next-hop destination;
       a change to neighborhood connectivity information since a packet was last sent to the next-hop destination; and
       a change to neighborhood connectivity information since a packet was last sent to the virtual interface;
    setting the virtual interface, and an identifier for the next-hop destination, in the packet; and
    sending the packet via the virtual interface.

17. The method of claim 16, wherein the next-hop destination includes one or more of:
    a network node;
    a set of network nodes;
    an anycast address; and
    a broadcast address.

18. An apparatus, comprising:
    a packet-processing module to generate a packet for a remote device;
    a virtual-interface selecting module to determine a next-hop destination for the packet, and determine a virtual interface for the next-hop destination based on neighborhood connectivity information for the next-hop destination, and based on one or more of:
       historical usage information for one or more virtual interfaces associated with the next-hop destination;
       a change to neighborhood connectivity information since a packet was last sent to the next-hop destination; and
       a change to neighborhood connectivity information since a packet was last sent to the virtual interface; and
    a communication module;
    wherein the packet-processing module is further configured to set the virtual interface, and an identifier for the next-hop destination, in the packet; and
    wherein the communication module is configured to send the packet via the virtual interface.

19. The apparatus of claim 18, wherein the next-hop destination includes one or more of:
    a network node;
    a set of network nodes;
    an anycast address; and
    a broadcast address.

* * * * *